3,196,316
PROTECTIVE ELECTRICAL SYSTEM FOR REMOTELY POWERED MOBILE MACHINES
Russell C. W. Crom, Mount Prospect, Ill., assignor to International Minerals & Chemical Corporation, a corporation of New York
Filed June 4, 1962, Ser. No. 199,945
10 Claims. (Cl. 317—18)

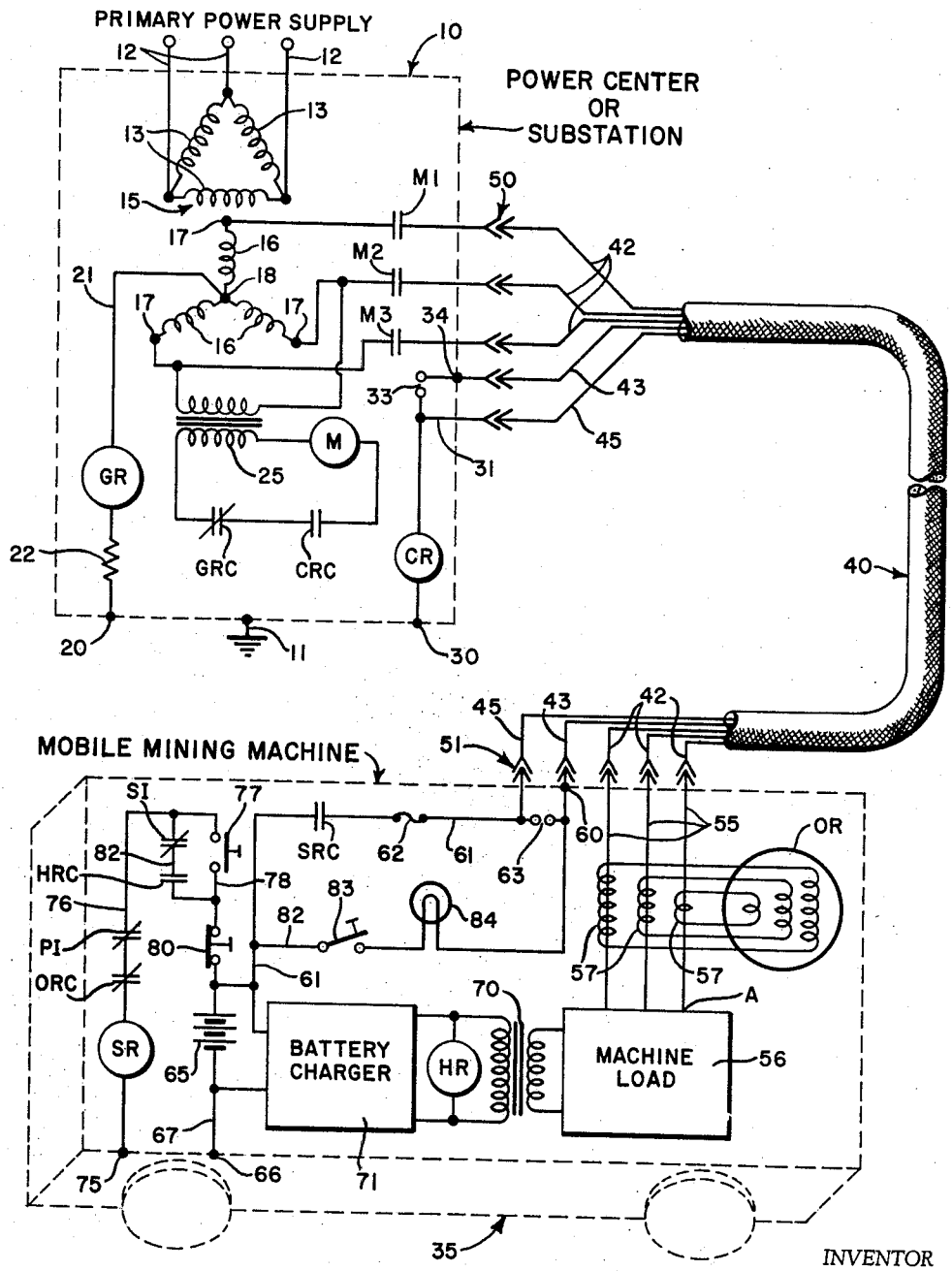

This invention relates generally to a protective electrical system for use in powering mobile machines through a trailing cable leading from a stationary power substation or power center. More specifically, the invention is directed to a protective electrical system which is effective to monitor the integrity of the ground wire connection to a mobile machine wherein the machine is supplied with alternating current power through a trailing cable from a stationary power substation and wherein the supply of power to the machine may be remotely controlled from the machine.

The invention finds particular applicability in connection with various types of mobile machines used in mining which are driven or operated by alternating current electric power supplied from a stationary power substation. Examples of mining machines which may take advantage of the protective electrical system of the instant invention are power shovels, drag lines, wheel excavators, loading machines, safety centers, continuous miners, etc. However, it will be recognized that the protective electrical system disclosed and claimed herein is not limited in its use to mobile mining machines.

For many years, there have been various types of mobile machines wherein the machine load to propel it or operate functions on the machine is dependent on electric power. Extensive use of electric power mobile machines occurs in connection with mining operations both where the electric power cost is relatively low to justify use of such power in place of fuel burning power plants and where the conditions in which the machines must operate are such that the fumes or fire hazard created by a fuel burning power plant on the machine cannot be tolerated.

In the examples of electrically powered mining machines as identified in the above list, both direct current power and alternating current power have been employed. The advantages in power transmission and the ease with which high voltages can be stepped down by power transformers and otherwise handled in connection with getting power to a machine have promoted the use of alternating current power for the operation of various mobile mining machines which have substantial power requirements. These mobile machines powered with alternating current have conventionally adopted the use of three-phase alternating current with a stationary power center or substation containing a power transformer for step down of the three-phase transmission voltages to the voltages required for operation of the particular mobile machine. This power transformer for supply of three-phase power conventionally will have delta connected primaries and Y connected secondaries. The invention herein is particularly well suited for use with three-phase alternating current power supplied to a mobile machine.

In the development of systems for supplying power to mobile machines having electrically operable loads, the necessity for effective grounding of the machine has been long recognized. In this connection, conventionally, the power cable leading from the stationary substation to the mobile machine has included, in addition to the main power carrying conductors, a ground wire to be connected to the frame of the machine and to ground at the substation. Insuring that the machine will at all times be grounded, requires that the integrity of this ground connection be continuously maintained.

Serious shock hazards to personnel will arise at the machine where the ground integrity between the machine and the substation fails. In such circumstances, the machine operator or other personnel coming in contact with the mobile machine may receive a fatal shock in the event that, for example, the current from one of the power conductors becomes connected to the frame of the machine.

In service, the trailing cable will be flexed a great number of times such that the ground wire may become broken to destroy the integrity of the ground connection to the machine. The trailing cable also may be damaged by accidental cuts or bruises which can result in an open ground circuit. In addition to normal wear of the cable, the ground connection through the trailing cable may be damaged in other ways. For example, the effectiveness of the connections of the ground wire to the machine or to the substation ground may be reduced to an extent that there is danger of electrical shock to personnel working around the machine.

The critical importance of maintaining the integrity of the ground connection between the mobile machine and power substation has led to the development of various protective systems designed to test for an open circuit condition in the ground connection. It also has been recognized as important to check for the possibility of the ground wire attempting to carry excessive current, a condition which may occur if a short circuit or low resistance leakage path develops between the ground wire and one of the power conductors in either the cable or at the machine.

The electrical systems which have been employed heretofore to solve the problems as outlined above, have not been fully effective in obtaining continuous monitoring of the integrity of the ground connection for the machine. They also have had limitations on their reliability in immediately detecting an open ground connection and cause the power to be interrupted without endangering personnel to electric shock or running the risk of electrical arcing which might set off an explosion of gases in a mine.

For example, it is fairly conventional to include in the power cable in addition to the conductors for the main power and the ground wire, a ground check wire. Conventionally, this ground check wire is grounded to the frame of the machine and coupled to operate a relay at the power substation. The circuit for this relay extends through the check wire to the machine and back through the ground wire so that should the ground wire become open, the relay will be released and in turn through operation of such relay the power supplied to the main conductors will be interrupted. This approach which has been fairly conventional has the drawback that there is no capability for control in cutting off or on the power from the machine. Further, if the ground wire and the check wire becomes shorted together at a point adjacent the power substation, an open circuit in the ground wire nearer to the machine will not be detected.

Considering the above outlined problems and drawbacks to prior protective electrical systems for remotely powered mobile machines, it is a principal object of the instant invention to provide an improved electrical system wherein effective continuous monitoring of the integrity of the ground wire connection between a mobile machine and a stationary powered substation is obtained.

Another object of the instant invention is to provide a protective electrical system as mentioned in the above object and wherein the cutting on and off of the power at the stationary substation can be remotely controlled by the operator at the mobile machine.

It is also an object of the instant invention to provide a protective electric system with continuous monitoring of the ground integrity to the mobile machine embodying three-phase alternating current power supplied to the machine with an independent direct current power source being provided at the machine to effect monitoring of the ground integrity and provide a power supply for use in remotely controlling the power from the machine.

A further object of this invention is to provide a protective electric system for mobile mining machines where continuous monitoring of the ground connection for the machines is achieved and where a battery power supply is provided on the machine to enable the continuous monitoring, permit remote control of cutting on and off of the power at the stationary substation and furnish direct current power for emergency lights on the machine in the event of the main power being cut off and wherein charging means powered by the main power source is provided on the machine to maintain the battery power supply charged during normal use of the mobile machine.

An additional object of the invention resides in the provision of a protective electrical system for remotely powered mobile machines wherein continuous monitoring of the ground connection integrity and remote control from the machine of the cutting on and off of the main power are provided together with voltage limiting means in the control circuit of the system to short circuit to ground voltages above a predetermined magnitude upon their occurrence in such control circuit.

The above and other objects and novel features of the instant invention will be readily apparent from the following description which is given in connection with the accompanying drawing. It is to be expressly understood that the drawing is for purposes of illustration and is not intended to define the limits of the invention, but rather to merely illustrate a preferred embodiment and circuitry incorporating the features of the instant invention.

In the accompanying drawing forming a part of this specification and wherein like reference numerals are employed to designate like parts, the single view is a schematic of the protective electrical system of the instant invention showing it associated with a stationary power substation and a mobile machine, the outline of the substation and machine being shown in dotted lines.

Referring to the drawing, a representation of a stationary power center or substation 10 is shown in dotted outline. The substation may take any suitable form of construction such as are well recognized in the handling of electric power. As so constructed the substation will usually have a metal housing which is to be appropriately grounded as shown at 11. Three-phase primary alternating current supply lines 12 extend into the housing of the substation 10 and are connected to the delta connected primaries 13 of a power transformer 15. The Y connected secondaries 16 of the power transformer 15 are provided at their outer ends with connection points 17. This power transformer with its output connection points 17 provides the power source of three-phase alternating current power to be fed to the electrically operable load on the mobile machine.

The center 18 of the Y connected secondaries 16 is connected to ground at 20 on the housing of the substation 10 through lead 21 which includes a ground current limiting resistor 22 and the coil of a ground current limiting relay GR. The relay GR is of the type that is tripped upon a certain magnitude of flow of current therethrough and must thereafter be manually reset. The contacts of relay GR, identified as GRC, are normally closed and are opened upon tripping of the relay. These contacts are connected in a circuit described hereinafter.

The lead 21 connecting the center point 18 of the transformer secondaries to ground is provided as a safeguard against malfunctioning of the mobile machine as may be reflected in drawing power from the power source in a manner such that a voltage differential between point 18 and ground arises whereupon current flows through lead 21, resistor 22 and relay GR. Upon current flow through lead 21 reaching a certain magnitude, relay GR will be tripped, opening its contacts GRC and thereupon cutting off the power source from the electrically operable load on the machine as will be described hereinafter.

Referring further to the circuit components provided at the power substation 10, a transformer 25 is provided with its primary connected across one phase of the secondaries of transformer 15. The secondary of transformer 25 is connected in a circuit including the normally closed contacts GRC of the previously described ground current relay GR and the coil M of a contactor. This circuit also includes the contacts CRC of a relay which will be described hereinafter.

The contactor embodies three contacts M1, M2 and M3 and coil M. The contacts are closed upon energization of the coil M. The contacts M1, M2 and M3 are disposed in power lines extending from the points 17 on the Y connected secondaries of the power transformer 15. These lines extend from the substation 10 and are connected to the flexible trailing cable leading to the mobile machine as will be described. It may be mentioned that in use of the term contactor in this specification and in the claims it is to be understood that the term is intended to embrace any suitable circuit closing device which will function to cut on and off the power to the machine.

The power substation also includes a control relay CR which has one side of its coil grounded at 30 to the housing of the substation 10 and the other side of its coil connected to a lead 31 which also extends from the substation to connect with one of the wires in the trailing cable.

As an added safety feature for the protective electrical system of the instant invention there is provided in the power substation circuitry a film-gap 33. The film-gap 33 is connected between lead 31 and ground 34 on the housing of the substation. The film-gap 33 is a standard item constructed to be non-conductive or prevent current flow thereacross until the voltage differential across the film-gap reaches a predetermined magnitude. Should the voltage differential reach or exceed this magnitude, the film breaks down, thereby short-circuiting the gap. The safety function provided by this film-gap 33 will be described subsequently.

As previously mentioned, the contacts CRC of control relay CR are disposed in the circuit including the contactor coil M. In the circuit condition as shown on the drawing, it will be apparent that with contacts GRC closed, as they are in the normal operating state of ground current limiting relay GR, the energization of relay CR will close its contacts CRC. This will result in coil M being energized through power derived from the secondary of transformer 25 with the result that contacts M1, M2 and M3 will be closed connecting the power source of the power conductors in the trailing cable as referred to hereinafter.

Portions of the trailing power cable 40 are shown on the drawing representative of the manner in which this cable is connected between the stationary power substation and the mobile mining machine 35. This cable 40 may be of any suitable construction as is conventionally used in powering mobile machines from a remote source. It will, of course, include the appropriate wires, as described herein, that are necessary for proper functioning of the protective electrical system of the instant invention.

The cable 40 includes three conductors 42, one for each phase of the alternating current power to be supplied to the machine in effecting its operation. In addition to the conductors 42, a ground wire 43 is included in the cable. The ground wire may take any one of a variety of suitable forms such as a braided metal covering on the cable or inclosed within a protective covering for the cable, a separate uninsulated metal ribbon in the cable, a stranded wire within the cable, etc.

Finally, the trailing cable 40 includes a ground monitoring wire 45. This wire is suitably insulated from each of the conductors 42 and from the ground wire 43. It performs the function as will be described hereinafter of enabling continuous check on the integrity of the ground wire 45 and ground connection to the machine as well as a check for the occurrence of any short circuiting within the cable that may occur betwen the ground wire and the ground monitoring wire.

The opposite ends of cable 40 are preferably provided with suitable plug-in couplings or jacks for the cable wires whereby the cable may be detachably connected to the power substation and detachably connected to the mobile machine. Provision for this detachable connection of the cable 40 is diagrammatically illustrated at 50 for the power substation 10 and at 51 for the mobile machine 35. It will be understood that the couplings for attachment of the ends of the cable 40 are so constructed that the respective leads within the cable will be connected to the proper leads in the substation or at the mobile machine when the plug-in connection of the couplings is completed. Thus, in the connection 50 at the substation the power conductors 42 are connected to the respective power lines extending from the points 17 on the secondaries of transformer 15 through the respective contacts M1, M2 and M3, the ground wire 43 is connected to ground at 34 on the housing of the power substation and the ground monitoring wire 45 is connected to lead 31 which extends to the coil of relay CR. Preferably, the jack for conductor 45 is shorter than the other jacks in the coupling at 50 so that the circuit cannot be energized until all other jacks in the coupling are seated.

Reference may now be made to the circuit components included on the mobile machine 35 to which the cable 40 is connected. The power conductors 42 are connected at 51 to lines 55 which extend on the machine to the particular electrically operable machine load 56 which is to be powered. The nature of this load is not critical with regard to the electrical system of the instant invention. It will be understood that this may be any electric load although usually it will consist of an electric motor coupled to drive the machine or operate functions to be carried out by the machine.

In connection with the lines 55, it will be noted that a current-responsive coil 57 is inductively associated with each line. Each of these coils is coupled with an overload current relay OR. The contacts ORC of this overload current relay OR are connected in a circuit described hereinafter so that upon the occurrence of excessive current flow in any one or more of the leads 55 extending to the machine load 56, relay OR will be tripped, resulting in cutting off the alternating current power supply to the machine.

The ground wire 43 is connected at 51 to ground 60 on the frame of the mobile machine. Ground monitoring wire 45 is connected at 51 to lead 61. Lead 61 includes a fuse 62 and contacts SRC of a relay described hereinafter, and extends to one side of a battery 65. The other side of battery 65 is connected to ground on the machine frame at 66 by way of a lead 67.

It may be noted in passing that lead 61 is connected to ground of the machine frame at 60 by a film-gap 63. This film-gap provides a safety feature in protecting against excess voltage differential between lead 61 and the machine frame which might arise due to a malfunction of the cable insulation. Upon occurrence of the voltage differential to which the film-gap 63 is set, the film breaks down and lead 61 is short circuited to ground on the machine frame at 60.

A transformer 70 has its primary connected across one phase of the alternating current power fed to the machine load 56 and its secondary connected to a suitable battery charger 71. The battery charger may be of any suitable construction such as a conventional dry rectifier type charger. The direct current output from battery charger 71 is applied across battery 65 to maintain the battery charged. It will be appreciated that charging of battery 65 will occur at all times during operation of the mobile machine when alternating current power is being supplied through lines 55 to the machine load 56.

The circuit which includes the coil of starting relay SR may now be described. Relay SR has normally open contacts SRC which, as previously mentioned, are interposed in lead 61. One side of the coil of relay SR is connected to ground at 75 on the machine frame and the other side of the coil extends through lead 76 which includes the normally closed contacts ORC of overload current relay OR.

In the illustrated circuit lead 76 extends to one side of a normally open start button 70. A lead 78 extends from the opposite side of the start button to one side of a normally closed stop button 80 and the opposite side of stop button 80 is connected to battery 65.

The coil of a holding relay HR is connected in parallel with the battery charger 71 and is thus energized through the secondary of transformer 70 whenever alternating current power is supplied to the machine load 56 through lines 55. The normally open contacts HRC of this relay are disposed in a lead 82 connected across the normally open contacts of start button 77.

If desired primary and secondary interlock contacts PI and SI may be interposed in leads 76 and 82 respectively. These interlock contacts can be provided to be opened and closed in accordance with the operation of one or another of the critical devices on the mobile machine. For example, in operation of the machine the primary interlock contact could be connected to be operated to closed position by positioning a lever on the machine in a particular disposition, this being a prerequisite to undertaking any electrically driven operation of the machine.

The battery 65 provides a convenient emergency power source for operating lights on the mobile machine. This is a particularly important feature in mine operation where a ground defect may actuate the system to cut off the main power. The lights may be appropriately connected in a lead 82 extending from lead 61 through a manually operable switch 83, light 84 and thence to ground on the machine frame at 60.

Having described the circuitry embodied in both the stationary power substation and the mobile machine, reference may now be made to the functioning of the protective electrical system. In the circuit condition as shown on the drawing, the machine load 56 is not energized, all power to the machine being cut off by reason of the open contacts M1, M2 and M3. It is assumed that ground current limiting relay GR is set with contacts GRC closed. The contactor coil M is de-energized by contacts CRC being open. Control relay CR is not energized since its battery power supply through the circuit including ground wire 43 and ground monitoring wire 45 is open at contacts SRC. Start relay SR is de-energized through the open start button 77 and open contacts HRC coupling this relay to battery 65 and relay HR is de-energized since no power is supplied to transformer 70.

With the primary and secondary interlock contacts PI and SI closed, the operator on the mobile machine can initiate supply of alternating current power to the machine from the substation by pressing start button 77. This completes the circuit from battery 65 to relay SR whereupon contacts SRC are closed and the battery energizes the circuit through ground monitoring wire 45 and ground wire 43 to control relay CR in the substation. Relay CR is thus energized closing contacts CRC whereupon main contactor coil M is energized. The contactor thereupon closes its contacts M1, M2 and M3, resulting in three-phase alternating current power being applied from the power source through conductors 42 in cable 40 and lines 55 to the electric machine load 56.

Upon alternating current power being applied to the machine load the primary of transformer 70 is energized and in turn relay HR is operated. This results in closing of contacts HRC which set up a holding circuit, bypassing the start button 77, and thereupon the machine operator may release button 77 for it to return to its normally open condition. The electrical system is thus placed in operation and the mobile machine may be operated as desired with full safety, pending any defect in the ground connection integrity. During this period of operation, the battery charger 71 is energized through the secondary of transformer 70 and will insure maintenance of battery 65 in a fully charged condition.

Should the operator desire to cut off electric power from the substation, it is merely necessary for him to press the normally closed stop button 80. This opens the circuit to relay SR resulting in contacts SRC opening. Thereupon control relay CR in the substation is de-energized and the circuit for the main contactor coil M opened when contacts CRC are opened, and in turn main contacts M1, M2 and M3 open, cutting off power to the conductors 42 and cable 40. It will be appreciated that with the power cut off, relay HR will be de-energized thereby reopening contacts HRC so that even upon release of stop button 80 the power will remain cut off until start button 77 is again pressed.

The safety characteristics provided by the electrical system as described hereinabove may now be pointed out. In the system, the energization of the main contactor coil M is required to close contacts M1, M2 and M3 and maintain them closed if any power is to be supplied from the substation. Energization of this relay requires both contacts GRC and CRC to be closed. Should some insulation failure occur at a point such as A on the mobile machine, increased current flow in this one line of the three-phase power will unbalance the center point 18 of the power transformer secondaries 16 causing current flow in line 21 and the tripping of relay GR to open its contacts GRC. Thus a man touching the frame of the mobile machine is protected from serious shock by the ground current limiting relay GR. Although the man is exposed to the voltage drop in the ground wire 43, this is a relatively small drop since resistor 22 is selected such that practically all of the line to ground voltage is dropped across this resistor.

The energization of control relay CR and thus maintenance of contact CRC closed its dependent on continuity or integrity of the ground connection to the machine through wire 43 and also through ground monitoring wire 45, since relay CR is energized by the direct current potential of battery 65 which is applied through these two wires. Thus, should any interruption in the ground connection occur, relay CR will be de-energized. Likewise should the ground wire 43 become short circuited at any point in cable 40 with the ground monitoring wire 45, this short circuit will drop the voltage required to energize relay CR, whereupon this relay will be de-energized.

The added safety provided by the two film-gaps 33 and 63 and by the fuse 62 in lead 61 gives a further advantage to the protective electrical system herein disclosed. These film-gaps may have a break-down voltage of around 40 volts, meaning that above this voltage differential across the film-gap the film will break down and a short circuit across the gap will occur. In the event that some peculiar cable failure should occur resulting in the ground monitoring wire 45 being shorted to one of the main conductors 42, an immediate heavy current flow to ground would pass through the monitoring wire.

As previously described, the unbalanced current flow in one of the main conductors 42 would create a voltage differential between center point 18 of the Y connected secondaries in the power transformer 15 and ground at the substation 10. This condition within a very short period of time would cause relay GR to act, opening contacts GRC and cutting off power to the cable. However, even a momentary high voltage and current flow in the monitoring wire 45 could damage the various control components in the system. Accordingly, the film-gaps 33 and 63 protect against such momentary high voltage by short circuiting the voltage and current flow direct to ground upon the voltage exceeding the set or predetermined break-down voltage, such as 40 volts, for the film included in the film-gap devices 33 and 63.

The fuse 62 in line 61 provides protection for the battery in the event of a short circuit between monitoring wire 45 and one of the main conductors 42, preventing high voltage and current from reaching the battery.

It is to be understood that the form of this invention herewith shown and described is to be taken only as a preferred example of the invention and that various changes and modifications in the arrangement of parts and interconnection of the components may be resorted to without departing from the spirit of the invention or the scope of the appended claims.

I claim:

1. A protective electrical system providing continuous monitoring of the integrity of the ground connection to a mobile machine supplied with power through a power cable from a stationary power substation provided with a power source,
    a mobile machine having an electrically operable load,
    a trailing power cable having power conductors and a ground wire all extending between said substation and said machine with said conductors connected to said electrically operable load, said ground wire being grounded to said machine and connected to ground at said substation,
    relay means at said substation connected to operate contacts disposed to couple said conductors to said power source dependent on the condition of operation of said relay means,
    a ground monitoring wire in said cable extending between said substation and said machine and forming with said ground wire a two wire control circuit for said relay means,
    a direct current power supply on said machine having connections grounding one side thereof to said machine and connecting the other side thereof to said ground monitoring wire,
    and selectively operable circuit closing means on said machine interposed in one of said connections to selectively connect said direct current power supply to said control circuit whereby said power supply energizes said relay means to effect closure of said contacts and thereby apply power to said electrically operable load.

2. A protective electrical system providing continuous monitoring of the integrity of the ground connection to a mobile machine supplied with power through a power cable from a stationary power substation comprising
    a stationary power substation provided with a power source,
    a mobile machine having an electrically operable load,
    a trailing power cable having power conductors and a ground wire all extending between said substation and said machine with said conductors connected to said electrically operable load, said ground wire being grounded to said machine and connected to ground at said substation,
    relay means at said substation connected to operate contacts disposed to couple said conductors to said power source dependent on the condition of operation of said relay means,
    a ground monitoring wire in said cable extending between said substation and said machine and forming with said ground wire a two wire control circuit for said relay means,
    a battery power supply on said machine having connections grounding one side thereof to said machine and connecting the other side thereof to said ground monitoring wire, charging means on said machine connected to receive power from said conductors to charge said battery power supply, and selectively operable circuit closing means on said machine interposed in one of said connections to selectively connect said battery power supply to said control circuit whereby said battery power supply energizes said relay means to effect closure of said contacts and thereby apply power to said electrically operable load and to said charging means.

3. A protective electrical system providing continuous monitoring of the integrity of the ground connection to a mobile machine supplied with alternating current power through a power cable from a stationary power substation comprising a stationary power substation provided with a power source for supply of alternating current power to a mobile machine, a mobile machine having an electrically operable load, a trailing cable including separate conductors and a ground wire, means for connecting said conductors to said power source and to said electrically operable load, means for grounding said ground wire at its opposite ends to said machine and to said stationary substation respectively, contacts disposed to interrupt supply of power to each conductor from said power source, relay means at said substation connected to operate said contacts, a ground monitoring wire in said cable extending between said substation and said machine, said ground monitoring wire being connected at said substation to said relay means to form with said ground wire a two-wire control circuit for said relay means, a battery power supply mounted on said machine having connections grounding one side thereof to said machine and connecting the other side thereof to said ground monitoring wire, charging means on said machine connected to receive power from said conductors and charge said battery power supply, and circuit closing means on said machine interposed in one of said connections and selectively operable to connect said battery power supply to said control circuit whereby said battery power supply energizes said relay means to effect closure of said contacts and thereby supply power through said conductors to said electrically operable load of the machine and to said charging means.

4. A protective electrical system as recited in claim 3 wherein means non-conductive below a predetermined voltage is connected between said ground monitoring wire and ground to short circuit to ground any voltage above said predetermined voltage upon the occurrence of a short circuit in said cable to said monitoring wire.

5. A protective electrical system as recited in claim 3 wherein lighting means are provided on said mobile machine connectible to said battery power supply to provide emergency lighting upon interruption of supply of power from said substation.

6. A protective electrical system as recited in claim 3 wherein an overload current relay is provided to be operated in response to excessive current flow in one of said conductors with the contacts of said relay disposed to effect opening of said control circuit upon said relay being operated.

7. A protective electrical system providing continuous monitoring of the integrity of the ground connection to a mobile machine supplied with power through a power cable from a stationary power substation having a power transformer with Y connected secondaries, providing a three-phase alternating current power source, the center point of said Y connected secondaries being connected to ground through a current limiting resistor and a ground current responsive relay, a mobile machine having an electrically operable load, a trailing power cable having power conductors and a ground wire all extending between said substation and said machine with said conductors connected to said electrically operable load, said ground wire being grounded to said machine and connected to ground at said substation, contacts disposed to interrupt supply of power to each conductor from said power source, means connecting said current responsive relay to open said contacts upon operation of said relay in response to a predetermined current flow between ground and said center point of the Y connected transformer secondaries, relay means at said substation connected to effect opening of said contacts, a ground monitoring wire in said cable extending between said substation and said machine and forming with said ground wire a two wire control circuit for said relay means, a battery power supply mounted on said machine having connections grounding one side thereof to said machine and connecting the other side thereof to said ground monitoring wire, charging means on said machine connected to receive power from said conductors to charge said battery power supply, and selectively operable circuit closing means on said machine interposed in one of said connections to selectively connect said battery power supply to said control circuit whereby said battery power supply energizes said relay means to effect closure of said contacts and thereby apply power to said electrically operable load and to said charging means.

8. A protective electrical system providing continuous monitoring of the integrity of the ground connection to a mobile machine supplied with power through a power cable from a stationary power substation having a power transformer with Y connected secondaries, providing a three-phase alternating current power source, the center point of said Y connected secondaries being connected to ground through a current limiting resistor and a ground current responsive relay, a mobile machine having an electrically operable load, a trailing power cable having power conductors and a ground wire all extending between said substation and said machine with said conductors connected to said electrically operable load, said ground wire being grounded to said machine and connected to ground at said substation, contacts disposed to interrupt supply of power to each conductor from said power source, means connecting said current responsive relay to open said contacts upon operation of said relay in response to a predetermined current flow between ground and said center point of the Y connected transformer secondaries, relay means at said substation connected to effect opening of said contacts, a ground monitoring wire in said cable extending between said substation and said machine and forming with said ground wire a two wire control circuit for said relay means, a battery power supply on said machine, charging means on said machine connected to receive power from said conductors to charge said battery power supply, leads connecting said battery power supply to said ground monitoring wire and to ground on said machine, second relay means having contacts interposed in said leads to control connection of the battery power supply potential to said ground monitoring wire, and manually operable switch means connected in circuit with said second relay means and said battery power supply to initiate closure of said first mentioned contacts and thereby apply power to said electrically operable load and to said charging means.

9. A protective electrical system as recited in claim 8 wherein lighting means are provided on said machine connected between said battery power supply and ground on the machine with switch means disposed to control application of the battey power supply potential to said lighting means.

10. A protective electrical system as recited in claim 8 wherein there is provided on said machine and at said substation film-gap means non-conductive below a predetermined voltage, said film-gap means being connected between said ground monitoring wire and ground to short circuit to ground any voltage above said predetermined voltage upon the occurrence of a short circuit in said cable to said monitoring wire.

References Cited by the Examiner

UNITED STATES PATENTS

| | | | |
|---|---|---|---|
| 1,998,403 | 4/35 | Weigel | 317—30 |
| 2,381,281 | 8/45 | Harder | 317—18 X |
| 2,478,147 | 8/49 | Wilson | 317—44 |
| 2,535,064 | 12/50 | Harrison | 317—18 |
| 2,864,036 | 12/58 | Steiner | 317—44 |
| 2,965,809 | 12/60 | Edsall | 317—13 X |

SAMUEL BERNSTEIN, *Primary Examiner.*